United States Patent
Bent, III et al.

(10) Patent No.: US 12,386,643 B2
(45) Date of Patent: Aug. 12, 2025

(54) CONVERSATIONAL INTERFACE FOR CONTENT CREATION AND EDITING USING LARGE LANGUAGE MODELS

(71) Applicant: Google LLC, Mountain View, CA (US)

(72) Inventors: Sylvanus Garnet Bent, III, Palo Alto, CA (US); Xiaolan Zhou, Santa Clara, CA (US); Mehmet Levent Koc, Redwood City, CA (US); Wei Luo, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/631,654

(22) Filed: Apr. 10, 2024

(65) Prior Publication Data

US 2024/0256311 A1    Aug. 1, 2024

Related U.S. Application Data

(63) Continuation of application No. 17/968,472, filed on Oct. 18, 2022, now Pat. No. 11,983,553.

(51) Int. Cl.
*G06F 9/451* (2018.01)
*G06F 40/166* (2020.01)

(52) U.S. Cl.
CPC ............ *G06F 9/453* (2018.02); *G06F 40/166* (2020.01)

(58) Field of Classification Search
CPC ....................................................... G06F 9/453
See application file for complete search history.

(56) References Cited

U.S. PATENT DOCUMENTS

| 11,367,447 | B2 | 6/2022 | Pair |
| 11,604,965 | B2 | 3/2023 | Sun |
| 2021/0316105 | A1 | 10/2021 | Godara et al. |

(Continued)

OTHER PUBLICATIONS

Abid et al., "Artificial intelligence (AI) applications for marketing: A literature-based study." International Journal of Intelligent Networks (2022), 14 pages.

(Continued)

*Primary Examiner* — James J Debrow
(74) *Attorney, Agent, or Firm* — DORITY & MANNING, P.A.

(57) ABSTRACT

Example embodiments of the present disclosure provide for an example method. The example method includes generating an initial user interface including a content assistant component. The example method include obtaining user input data. The example method includes processing, by a machine learned model interfacing with the content assistant component, the data indicative of the input received from the user. The method includes obtaining output data, from the machine learned model interfacing with the content assistant component, indicative of one or more content item components. The method includes transmitting data which causes the content item components to be provided for display via an updated user interface. The method includes obtaining data indicative of user selection of approval of the content item components. The method includes generating, in response to obtaining the data indicative of the user selection of the approval of the content item components, content items.

20 Claims, 12 Drawing Sheets

(56) References Cited

U.S. PATENT DOCUMENTS

| | | | |
|---|---|---|---|
| 2021/0327413 A1 | 10/2021 | Widya et al. | |
| 2022/0029937 A1* | 1/2022 | Atallah et al. | ........ H04L 51/046 |
| 2022/0061746 A1 | 3/2022 | Lyman et al. | |
| 2023/0117235 A1 | 4/2023 | Muse et al. | |
| 2023/0316105 A1 | 10/2023 | Nguyen et al. | |

OTHER PUBLICATIONS

Aureus Analytics Blog, "5 Natural Language Processing Techniques for Extracting Information", 2020, https://blog.aureusanalytics.com/blog/5-natural-language-processing-techniques-for-extracting-information , retrieved on Nov. 2, 2022, 10 pages.

Google AI Blog, "Exploring Transfer Learning with T5: the Text-To-Text Transfer Transformer", Feb. 24, 2020, https://ai.googleblog.com/2020/02/exploring-transfer-learning-with-t5.html, retrieved on Nov. 2, 2022, 5 pages.

Google AI Blog, "LaMDA: Our Breakthrough Conversation Technology", May 18, 2021, https://blog.google/technology/ai/lamda/ retrieved on Nov. 2, 2022, 3 pages.

Google Products Blog, "MUM: A New AI Milestone for Understanding Information", May 18, 2021, https://blog.google/products/search/introducing-mum/, retrieved on Nov. 2, 2022, 5 pages.

International Search Report and Written Opinion for Application No. PCT/US2023/035397, mailed Dec. 13, 2023, 17 pages.

Linguamatics, "What is Text Mining, Text Analytics and Natural Language Processing?", 2022, https://www.linguamatics.com/what-text-mining-text-analytics-and-natural-language-processing, retrieved on Nov. 2, 2022, 6 pages.

Nim, "Knowledge Distillation of Language Models", Oct. 31, 2021, https://alexnim.com/coding-projects-knowledge-distillation.html, retrieved on Jan. 2, 2024, 8 pages.

Open AI, "DALL-E: Creating Images from Text", https://openai.com/blog/dall-e/, Jan. 5, 2021, retrieved on Nov. 2, 2022, 10 pages.

Youngmann, "Algorithmic Copywriting: Automated Generation of Health-Related Advertisements to Improver Their Performance", Information Retrieval Journal 24.3 (2021), pp. 205-239.

Zhang, "Automatic Product Copywriting for E-commerce", arXiv:2112.11915v1, dated Dec. 15, 2021, 10 pages.

\* cited by examiner

CONVERSATIONAL INTERFACE FOR CONTENT CREATION AND EDITING USING LARGE LANGUAGE MODELS

PRIORITY CLAIM

The present application is a continuation of U.S. application Ser. No. 17/968,472 having a filing date of Oct. 18, 2022. Applicant claims priority to and the benefit of each of such applications and incorporate all such applications herein by reference in its entirety.

FIELD

The present disclosure relates generally to systems and methods for providing a conversational interface for content creation and editing using large language models. More particularly, the present disclosure relates to training and implementing one or more language models to facilitate a conversational interface for content creation and editing.

BACKGROUND

Computing devices can perform many tasks and provide interactive interfaces for content generation. Interactive interfaces for content generation can include a plurality of interactive components including input fields.

SUMMARY

Aspects and advantages of embodiments of the present disclosure will be set forth in part in the following description, or can be learned from the description, or can be learned through practice of the embodiments.

In one example aspect, the present disclosure provides for an example system including one or more processors and one or more memory devices storing instructions that are executable to cause the one or more processors to perform operations. In the example system, the operations include providing input data to a first machine learned model. In the example system, the operations include obtaining output data indicative of one or more suggested content item components. In the example system, the operations include evaluating the first machine learned model based at least in part on the output data by obtaining data indicative of a quality score associated with the output data of the first machine learned model. In the example system, the operations include evaluating the first machine learned model based at least in part on the output data by comparing the quality score associated with the output data of the first machine learned model to a threshold quality score. In the example system, the operations include determining that the first machine learned model has a quality score above the threshold quality score. In the example system, the operations include in response to determining that the first machine learned model has a quality score above the threshold quality score, implementing the first machine learned model in a content creation flow.

In some embodiments of the example system, the operations include generating an initial user interface comprising a content assistant component. In some embodiments of the example system, the operations include obtaining data indicative of user input. In some embodiments of the example system, the operations include processing, by the first machine learned model, the data indicative of user input. In some embodiments of the example system, the operations include obtaining output data, from the first machine learned model, indicative of one or more content item components. In some embodiments of the example system, the operations include transmitting data which causes the one or more content item components to be provided for display on a user interface. In some embodiments of the example system, the operations include obtaining data indicative of user selection of approval of the one or more content item components. In some embodiments of the example system, the operations include generating, in response to obtaining the data indicative of the user selection of the approval of the one or more content item components, one or more content items comprising a plurality of the content item components.

In some embodiments of the example system, the content assistant component comprises one or more input fields.

In some embodiments of the example system, the first machine learned model has been trained using a knowledge distillation training method.

In some embodiments of the example system, the first machine learned model has been trained based at least in part on output from a pre-trained second machine learned model.

In some embodiments of the example system, the pre-trained second machine learned model is a large language model.

In some embodiments of the example system, the pre-trained second machine learned model is tuned using one or more prompts.

In some embodiments of the example system, the input data comprises at least one of free-form input or landing page content.

In some embodiments of the example system, the input data comprises natural language input.

In some embodiments of the example system, the one or more content item components comprises at least one of a headline or description.

In an example aspect, the present disclosure provides for a computer-implemented method, the method includes generating an initial user interface comprising a content assistant component. The example method includes obtaining data indicative of an input received from a user. The example method includes processing, by a machine learned model interfacing with the content assistant component, the data indicative of the input received from the user. The example method includes obtaining output data, from the machine learned model interfacing with the content assistant component, indicative of one or more content item components. The example method includes transmitting data which causes the one or more content item components to be provided for display via an updated user interface. The example method includes obtaining data indicative of user selection of approval of the one or more content item components. The example method includes generating, in response to obtaining the data indicative of the user selection of the approval of the one or more content item components, one or more content items.

In some embodiments of the example method, training the machine learned model using a knowledge distillation training method.

In some embodiments of the example method, the method can include training the machine learned model by inputting labeled data into a first machine learned model. The example method can include training the machine learned model by obtaining output data from the first machine learned model. The example method can include training the machine learned model by comparing the output data from the first machine learned model to output data from a second machine learned model. The example method can include training the machine learned model by adjusting the first machine learned model based on comparing the output data of the first and second machine learned models.

In some embodiments of the example method, the labeled data comprises data that is output by a second machine learned model, the second machine learned model is a pre-trained model.

In some embodiments of the example method, the output by the second machine learned model comprises annotated data.

In some embodiments of the example method, the labeled data comprises at least one of (i) business and products descriptions, (ii) proxy data from websites associated with a content creator, (iii) human curated data, or (iv) free-form inputs.

In some embodiments of the example method, the method can include training the machine learned model by inputting unlabeled data into the machine learned model and a pre-trained second machine learned model. In some embodiments of the example method, the method can include training the machine learned model by obtaining output data from the machine learned model and the pre-trained second machine learned model. In some embodiments of the example method, the method can include training the machine learned model by comparing the output data from the machine learned model to the output data from the pre-trained second machine learned model. In some embodiments of the example method, the method can include training the machine learned model by adjusting the machine learned model based on comparing the output data of the machine learned model and the output of the pre-trained second machine learned model. In some embodiments of the example method, the initial user interface comprises a graphical user interface.

In an example aspect, the present disclosure provides for an example non-transitory computer readable medium embodied in a computer-readable storage device and storing instructions that, when executed by a processor, cause the processor to perform operations. In the example non-transitory computer readable medium, the operations include providing input data to a first machine learned model. In the example non-transitory computer readable medium, the operations include obtaining output data indicative of one or more suggested content item components. In the example non-transitory computer readable medium, the operations include evaluating the first machine learned model based at least in part on the output data by obtaining data indicative of a quality score associated with the output data of the first machine learned model. In the example non-transitory computer readable medium, the operations include evaluating the first machine learned model based at least in part on the output data by comparing the quality score associated with the output data of the first machine learned model to a threshold quality score. In the example non-transitory computer readable medium, the operations include determining that the first machine learned model has a quality score above the threshold quality score. In the example non-transitory computer readable medium, the operations include in response to determining that the first machine learned model has a quality score above the threshold quality score, implementing the first machine learned model in a content creation flow.

In the example non-transitory computer readable medium, the operations include generating an initial user interface comprising a content assistant component. In the example non-transitory computer readable medium, the operations include obtaining data indicative of an input received from a user. In the example non-transitory computer readable medium, the operations include processing, by the first machine learned model, the data indicative of the input received from the user. In the example non-transitory computer readable medium, the operations include obtaining output data, from the first machine learned model, indicative of one or more content item components. In the example non-transitory computer readable medium, the operations include transmitting data which causes the one or more content item components to be provided for display on a user interface. In the example non-transitory computer readable medium, the operations include obtaining data indicative of user selection of approval of the one or more content item components. In the example non-transitory computer readable medium, the operations include generating, in response to obtaining the data indicative of the user selection of the approval of the one or more content item components, one or more content items.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
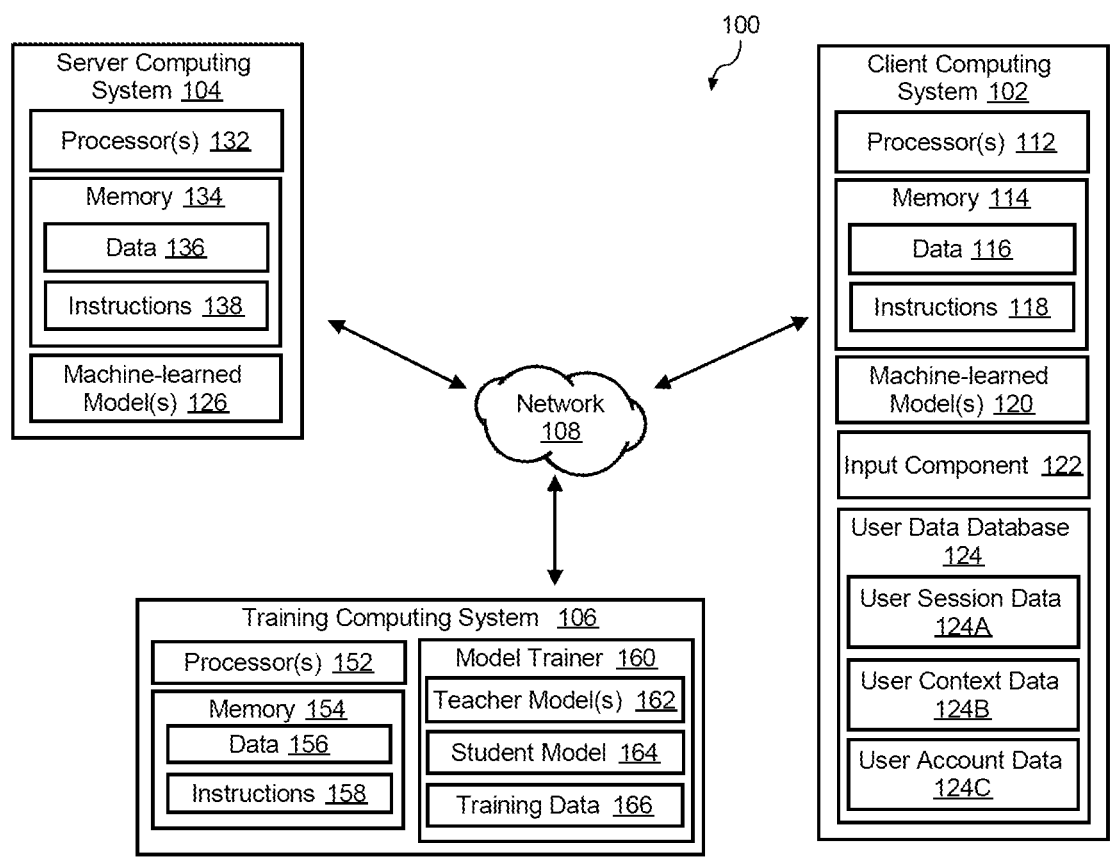
FIG. 1 depicts a block diagram of an example system for providing a conversational interface for content creation and editing using large language models according to example embodiments of the present disclosure.

Generally, the present disclosure is directed to systems and methods for generating and tuning large language models that obtain natural language user input and generate content item components as output. The computing systems and methods can include providing for display an interface for the generation and editing of content items in response to obtaining and processing data indicative of free-form user input. For example, the computing system can initiate the display of a content assistant component. The system can obtain, via the content assistant component, user input including free-form speech and generate advertisements based on analyzing the speech, extracting information from a website related to the user, and generating headlines and/or other content items (e.g., advertisement components) that a user would normally need to manually input into a plurality of fields associated with a structured interface. The structured interface can be associated with a content creation flow. The content creation flow can be used to generate content items (e.g., advertisements, advertisement campaigns). The traditional structured interface requires manual entry into a plurality (e.g., sometimes 40 or more) input fields associated with rigid requirements.

Implementations of the present disclosure can provide for a more efficient and user-friendly generation of content items using complex machine learned models. In some implementations, analyzing the user input can be performed by machine learned models (e.g., natural language processing models). In some implementations, the systems and methods can include training and/or tuning machine learned models. By way of example, the computing system can obtain input for the model from a plurality of sources. Sources can include, for example, business and products descriptions, proxy data from websites associated with a content creator, human curated data, free-form inputs, etc. Outputs of the model can include content item components (e.g., headlines, descriptions, graphics, videos, color schemes). The computing system can train the machine learned model(s) to be implemented as part of a content item generation process.

In some implementations, the training process can include knowledge distillation using one or more teacher and student models. For example, a teacher model can be an existing large language model. In some examples, a student model can be a customized model developed to generate customized content items (e.g., headlines, descriptions, advertisements, videos, images, sound bites). For example, a machine learned model can provide output including content item components (e.g., headlines, descriptions, advertisements, videos, images, sound bites). The output of the student model can be evaluated to determine a quality score associated with the output. For example, the quality score can be associated with an automatically generated quality score, a user satisfaction with the content item components, human implemented grading, etc.

In some implementations, the computing system can collect a plurality of datasets, adopt Large Language Models to generate and annotate data examples, and/or train high-quality servable models for productions. The computing system can evaluate the machine learned model(s). For example, evaluation can include offline and/or online evaluation. The computing system can also determine if the machine learned model is faithful.

The present disclosure provides for numerous technical effects and benefits. For example, the present disclosure can reduce processing by reducing the number of manual inputs provided by a user. Additionally, the computing system can provide for reduction in processing by reducing the number of interface screens which must be obtained, loaded, interacted with, and updated. For example, a user can provide data indicative of input (e.g., audio input, text input, etc.). The computing system can intelligently process the data indicative of input and extract relevant information from the input. In some implementations, the computing system can provide follow-up questions to guide a user to provide input related to a desired content item to be generated. The computing system can provide for reduction in user error due to less user input and pre-processing of data indicative of user input to populate the plurality of fields that traditionally would be manually filled by a user via a structured user input.

With reference now to the Figures, example embodiments of the present disclosure will be discussed in further detail.
Example Devices and Systems FIG. 1 depicts a block diagram of an example computing system 100 that generates, trains, and/or uses complex language models to interact with a user interface for facilitating generation of content item example embodiments of the present disclosure. The computing system 100 includes a client computing system 102, a server computing system 104, and a training computing system 106 that are communicatively coupled over a network 108.

The client computing system 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more computer-readable storage media which may be non-transitory, such as RAM, ROM, EEPROM, EPROM, flash memory devices, magnetic disks, etc., and combinations thereof. The memory 114 can store data 116 and instructions 118 which are executed by the processor 112 to cause the client computing system 102 to perform operations.

In some implementations, the client computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 2 and 3.

In some implementations, the one or more machine-learned models 120 can be received from the server computing system 104 over network 108, stored in the user computing device memory 114, and then used or otherwise implemented by the one or more processors 112. In some implementations, the client computing system 102 can implement multiple parallel instances of a single machine-learned model 120 (e.g., to perform parallel retrieval and composition of modular application spaces across multiple instances of user data obtained via a user interface associated with a user device.

More particularly, the machine learned model can obtain data indicative of user input (e.g., user session data 124A). The user input data can be associated with a current user session and/or include historical user data. For example, data associated with a current user session can be data obtained in real-time via a user input component 122. Historical user data can include data associated with a user account, user characteristics, etc. Historical user data can include data associated with a user device (e.g., device identifier). In addition, or alternatively, historical user data can include data associated with a user identifier. In some embodiments, historical user data can include aggregated data associated with a plurality of user identifiers. In some embodiments, the training data 166 can include session data (e.g., of one or more input sessions) associated with one or more input devices, such as session data indexed over a type of input interface or device (e.g., mobile device with touchscreen, mobile device with keyboard, large touchscreen, small touchscreen, large touchscreen, voice inputs, or combinations thereof, etc.). In some embodiments, the training data 166 can include session data not associated with user identifiers. Using the machine-learned model, the computing system can generate, train, and maintain one or more student models 164 (e.g., customized language models). The computing system can use the student models 164 to facilitate a user interface for generating customized content items (e.g., headlines, descriptions, advertisements) based on natural language input obtained from a user. The computing system can retrieve, suggest, and/or generate one or more content items in response to obtaining a user input (e.g., natural language input).

Additionally, or alternatively, one or more machine-learned models 126 can be included in or otherwise stored and implemented by the server computing system 104 that communicates with the client computing system 102 according to a client-server relationship. For example, the machine-learned models 126 can be implemented by the server computing system 104 as a portion of a web service (e.g., a content development service, a campaign management service, a content strategy management service). Thus, one or more machine-learned models 120 can be stored and implemented at the client computing system 102 and/or one or more models 126 can be stored and implemented at the server computing system 104.

The client computing system 102 can also include one or more user input components 122 that can receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The client computing system can include a user data database 124. User data database 124 can include user session data 124A, user context data 124B, and/or user account data 124C. User session data 124A can include data obtained via user input component 122 indicative of a current user session. For example, user session data 124A can include a current search term and/or other user input received within a threshold time of the current session. For example, a user can submit a first search and five minutes later submit a second search. The proximity of the first search and second search in time can be user context data 124B. The computing system can use user context data 124B when processing the user query to determine relevant content items and predicted performance increases (e.g., predicted performance metrics) to provide in response to the data indicative of user input to the structured user interface. The data indicative of user input can be used by client computing system 102 to send a request to server computing system 104 for one or more suggested content item components (e.g., suggested headlines, generated user interface elements, suggested labels). The computing system can cause the one or more suggested content items to be retrieved, generated, and/or presented to a user via a user interface of a device (e.g., user device). User context data 124B can include context of prior sessions and/or historical session data. User context data can include a location, a time, prior campaigns, prior content items used, device used, type of construction workflow used, etc. User account data 124C can include data associated with a user account (e.g., login, device identifier, user identifier).

The server computing system 104 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more computer-readable storage media which may be non-transitory, such as RAM, ROM, EEPROM, EPROM, flash memory devices, magnetic disks, etc., and combinations thereof. The memory 134 can store data 136 and instructions 138 which are executed by the processor 132 to cause the server computing system 104 to perform operations.

In some implementations, the server computing system 104 includes or is otherwise implemented by one or more server computing devices. In instances in which the server computing system 104 includes plural server computing devices, such server computing devices can operate according to sequential computing architectures, parallel computing architectures, or some combination thereof.

As described above, the server computing system 104 can store or otherwise include one or more machine-learned models 126. For example, the machine-learned models 126 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example machine-learned models 126 are discussed with reference to FIGS. 2-3.

The client computing system 102 and/or the server computing system 104 can train the machine-learned models 120 and/or 126 via interaction with the training computing system 106 that is communicatively coupled over the network 108. The training computing system 106 can be separate from the server computing system 104 or can be a portion of the server computing system 104.

The training computing system 106 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more computer-readable storage media which may be non-transitory, such as RAM, ROM, EEPROM, EPROM, flash memory devices, magnetic disks, etc., and combinations thereof. The memory 154 can store data 156 and instructions 158 which are executed by the processor 152 to cause the training computing system 106 to perform operations. In some implementations, the training computing system 106 includes or is otherwise implemented by one or more server computing devices (e.g., the server computing system 104).

The training computing system 106 can include a model trainer 160 that trains the machine-learned models 120 and/or 126 stored at the client computing system 102 and/or the server computing system 104 using various training or learning techniques, such as, for example, knowledge distillation. For example, model trainer 160 can include one or more teacher models 162, one or more student models 164, and/or training data 166. For example, teacher models 162 can include one or more pre-trained large language models. The large language models can include deep neural networks that require extensive resources and time to train. The large language models can be equipped to determine meaning from natural language input.

In some implementations, the training data can include labeled data. For example, the labeled data can be input to the teacher model and/or the student model. In some examples, the training data 166 can be data that is obtained as output from the teacher model 162. The computing system can obtain output from the teacher model 162 and label the data. This labeled data can be used to train the student model 164. The use of training data 166 to train the student model 164 will be described further with regard to FIGS. 2-3.

In some implementations, the various training or learning techniques can include, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 126 based on a set of training data 166. The training data 166 can include, for example, past performance metrics (e.g., predicted performance increase(s)). In some implementations, the one or more student models 164 can be machine-learned models 120 and/or 126.

In some implementations, if the user has provided consent, the training examples can be provided by the client computing system 102. Thus, in such implementations, the machine-learned model 120 provided to the client computing system 102 can be trained by the training computing system 106 on user-specific data received from the client computing system 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 108 can be any type of communications network, such as a local area network (e.g., intranet), wide area network (e.g., Internet), or some combination thereof and can include any number of wired or wireless links. In general, communication over the network 108 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. The semantic intent output may comprise at least one word or phrase determined from the text or natural language data. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the machine-learned models can be deployed on-device. For example, one or more components of a predictive machine-learned model or pipeline can be deployed on-device to avoid the upload of potentially sensitive information relating to the types of input, the types of device(s), or the contents of the inputs (e.g., relating to disabilities, contact information, address, etc.) to a server. For example, the server computing system can send a form with a learned context vector describing one or more input fields associated with a component (e.g., portion of an application associated with performance of a processing task). An onboard client model associated with the client computing system 102 can input local client characteristics (e.g., obtained via the user input component 122) and a context vector to generate a composed modular application. This on device processing can increase data privacy for a user. In some embodiments, this can also reduce the amount of data transmitted off-device, thereby reducing bandwidth usage.

Example Model Arrangements

Figure 2:
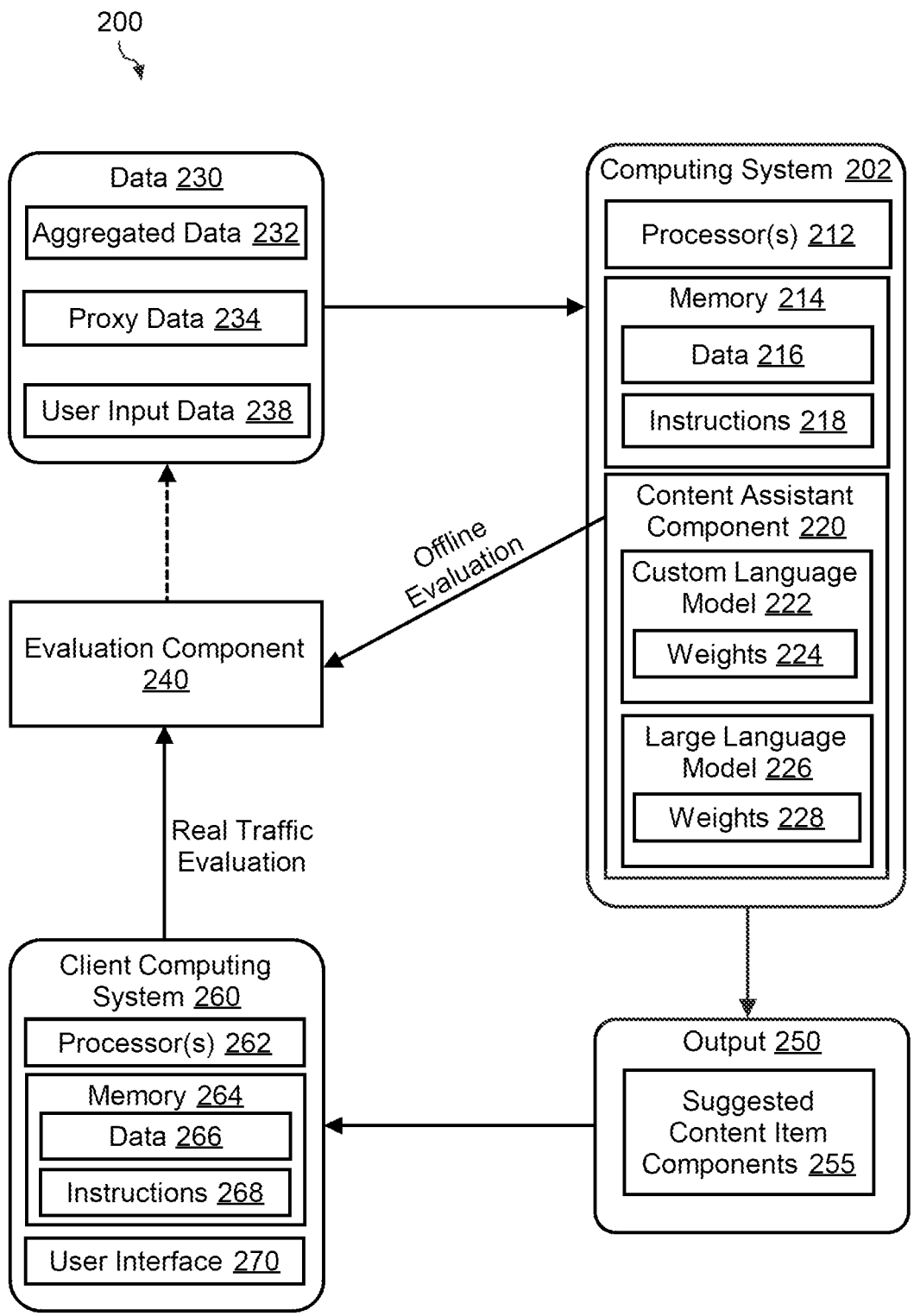
FIG. 2 depicts a block diagram associated with machine-learned model(s) according to example embodiments of the present disclosure.

FIG. 2 depicts one example system 200 for generating predicted performance increases associated with suggested content items and providing an updated user interface including the suggested content items and the respective predicted performance increase according to example embodiments of the present disclosure. The example system 200 contains a computing system 202. The computing system 202 can be any type of system of one or more computing devices (e.g., client computing system 102, server computing system 104, etc.). A computing device can be, for example, a personal computing device (e.g., laptop or desktop), a mobile computing device (e.g., smartphone or tablet), a gaming console or controller, a wearable computing device, an embedded computing device, a server computing device, a node of a distributed computing device, a virtual instance hosted on a shared server, or any other type of computing device. In some embodiments, the computing system 202 includes a plurality of computing devices interconnected via a network or otherwise distributed in an interoperable manner. For example, the computing system 202 can include a server for serving content over a network (e.g., network 108). For instance, the computing system 202 can include a web server for hosting web content, for collecting data regarding web content (e.g., for receiving, monitoring, generating, or otherwise processing data regarding web content, such as the use, download of, and/or interaction with web content).

The computing system 202 can contain processor(s) 212 and memory 214. The one or more processors 212 can be any suitable processing device (e.g., a processor core, a microprocessor, an ASIC, an FPGA, a controller, a microcontroller, etc.) and can be one processor or a plurality of processors that are operatively connected. The memory 214 can include one or more computer-readable storage media which may be non-transitory, such as RAM, ROM, EEPROM, EPROM, flash memory devices, magnetic disks, etc., and combinations thereof. The memory 214 can store data 216 and instructions 218 which are executed by the processor 212 to cause the computing system 202 to perform operations.

In some implementations, the computing system 202 can store or otherwise implement one or more machine-learned models of a machine-learned model framework. In some embodiments, the content assistant component 220 comprises a two-model machine-learned model framework. In some embodiments the content assistant component comprises no machine-learned model framework and/or any combination of custom language model 222 and/or large language model 226. The machine-learned model framework can include a machine-learned custom language model 222 (e.g., with learnable weights 224) and/or a machine-learned large language model 226 (e.g., with learnable weights 228). In some embodiments, the content assistant component 220 can implement a single model that implements custom language model 222 for content suggestion, content ranking, content generating, and/or any combination (e.g., by combining one or more aspects of the custom language model 222 and/or large language model 226, by training a single model to obtain the desired outputs directly, etc.). One or more of the machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

Embodiments of the example system 200 may be configured, as shown in FIG. 2, to process a data 230. Responsive to processing the data 230, the computing system 202 can provide output 250. Output 250 can include generated suggested content item components 255. Suggested content item components 255 can be provided for display via user interface 270 of a client device associated with client computing system 260. Client computing system 260 can contain processor(s) 262 and memory 264. The one or more processors 262 can be any suitable processing device (e.g., a processor core, a microprocessor, an ASIC, an FPGA, a controller, a microcontroller, etc.) and can be one processor or a plurality of processors that are operatively connected. The memory 264 can include one or more computer-readable storage media which may be non-transitory, such as RAM, ROM, EEPROM, EPROM, flash memory devices, magnetic disks, etc., and combinations thereof. The memory 264 can store data 266 and instructions 268 which are executed by the processor 262 to cause the client computing system 260 to perform operations.

The output 250 can include suggested content item components 255. Suggested content item components 255 can include, for example suggested headlines, descriptions, follow-up communications, videos, images, sound bites, etc. For example, the custom language model 222 can obtain user input and provide follow-up communications to gather additional input to generate further suggested content item components 255.

In some embodiments, the data 230 is obtained via an input interface of a computing system (e.g., computing system 202 and/or client computing system 260). For example, in some embodiments, the content assistant component 220 can be configured to process data 230 as input to the computing system 202. In some embodiments, the data 230 can be implicit in the structure and/or configuration of content assistant component 220.

In some implementations, the content suggestion generator model is trained to receive a set of input data (e.g., data 230) descriptive of user input and, in response, provide output data (e.g., suggested content item components 255) indicative of one or more suggested content items to be rendered via a user interface. For instance, FIG. 2 illustrations instances of evaluation.

For instance, evaluation component 240 can perform offline evaluation and/or online evaluation (e.g., real traffic evaluation). Evaluation can include offline and online evaluation. Offline evaluation can include using a human evaluation platform. The human evaluation platform can include a template and/or rubric for standardizing evaluation. Online evaluation can include pilot and/or live traffic experiments to capture online metrics. In some implementations evaluation component 240 can include automated evaluation and/or manual evaluation. In some implementations evaluation component 240 can include tagging and/or labeling data as training data. The system can determine a quality score for the model. The system can compare the quality score for the model to a threshold quality score. If the quality score of the model is greater than the threshold quality score, the system can determine the model is ready to be used. If the quality score for the model is below the threshold quality score, the system can determine the model needs additional training and/or tuning before being used.

In some implementations, the input data can include one or more features that are associated with an instance or an example. In some implementations, the one or more features associated with the instance or example can be organized into a feature vector. In some implementations the output data can include one or more predictions. Predictions can also be referred to as inferences. Thus, given features associated with a particular instance, the machine-learned model can output a prediction for such instance based on the features.

The machine-learned model can be or include one or more of various different types of machine-learned models. In particular, in some implementations, the machine-learned model can perform classification, regression, clustering, anomaly detection, recommendation generation, and/or other tasks.

In some implementations, the data 230 includes aggregated data 232, proxy data 234, and/or user input data 238. In some embodiments, data 230 can include instances of substantially any kind or type of data that may be descriptive of various phenomena. In general, an instance refers to a set of one or more data values grouped together to describe a particular subject or subject matter. For example, an instance can be a feature vector. An instance can be associated with image data (e.g., a feature vector for an image, a hashed image, etc.). An instance can be associated with a measurement or other data collection event (e.g., at a particular time, or of a particular subject, or using a particular device, or from a particular perspective, etc.). An instance can be associated with a network session, such as a set of interactions with a web server. In some embodiments, an instance can be associated with a user's interaction with web content (e.g., anonymous or identified).

In some embodiments, the custom language model 222 can be trained using knowledge distillation. For example, the custom language model 222 can be a student model and the large language model 226 can be a teacher model. A knowledge distillation training process can occur to train the small custom language model 222 based on the pre-trained large language model 226. For example, the large language model can be a large model that has been generated and trained using a large amount of computing resources. In order to conserve resources, knowledge distillation can be used to train the custom language model 222 to generate similar results to the pre-trained large language model 226.

In some implementations, the models of content assistant component 220 can be tuned and/or trained using prompting. For example, the computing system can obtain prompts indicative of sample inputs and outputs. The sample inputs and outputs can be used to tune the models to be familiar with the kinds of inputs and outputs that are desired for a specific implementation. For example, a particular implementation can include generation of an advertisement. Generation of advertisements requires understanding of nuances of businesses, business goals, products, etc. In this way, by prompting the one or more models (e.g., custom language model 222 and/or large language model 226), the computing system can tune the models to provide higher quality output (e.g., output 250 which can be evaluated using evaluation component 240). In some instances, after evaluation component 240 has performed evaluation, the data can be aggregated and used as data 230 for further model training.

In some implementations, the content assistant component 220 can be a machine-learned model. In some implementations, training and tuning can include using data 230. Aggregated data 232 can include data obtained from one or more user sessions that have been aggregated by system (e.g., computing system 202). Proxy data 234 can include for example, output data obtained from content assistant component 220. In some implementations proxy data 234 can be tagged and/or labeled representative of sample inputs and/or outputs. User input data 238 can include user generated input comprising inputs and/or outputs associated with content item desires and generated content items.

The trained model can be used to generate one or more suggested content items and/or update a structured user interface and/or construction workflow. In some embodiments, a simulated user model can be trained using the training data to generate simulated inputs according to patterns learned from the training data. The simulated user model can, in some instances, provide a simulated environment in which the reinforcement learning agent, the notification element subsystem, can be trained.

Example Methods

Figure 3:
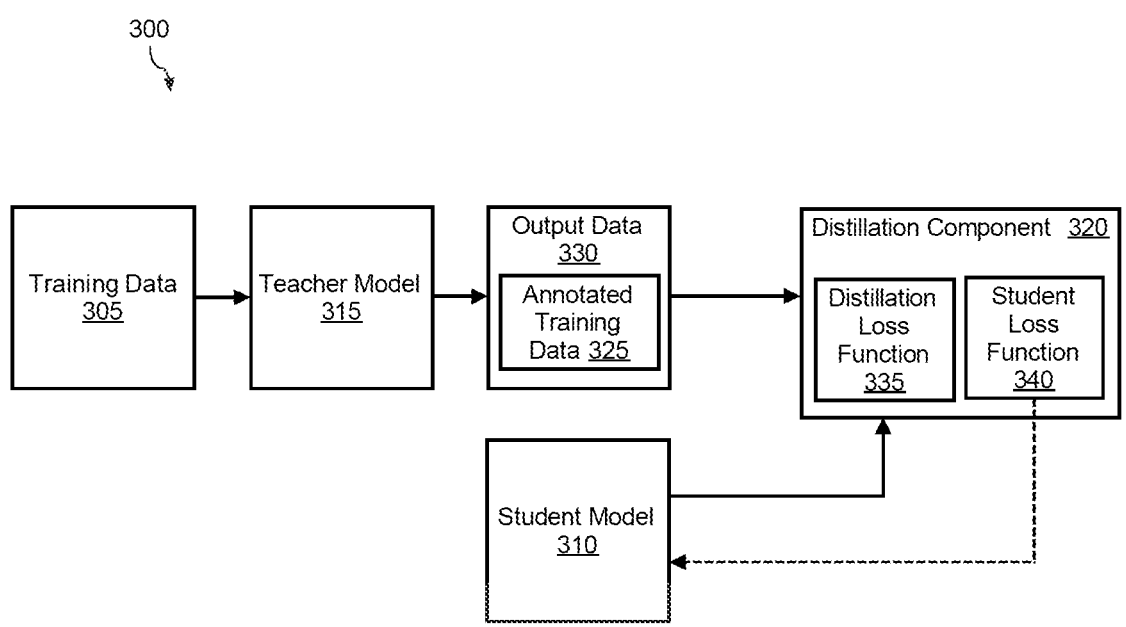
FIG. 3 depicts a flowchart of an example method for training machine-learned model(s) according to example embodiments of the present disclosure.

FIG. 3 depicts a flow chart diagram of an example method 300 for training student models 310 using knowledge distillation. Training student model 310 can include utilizing teacher model 315, training data 305, and/or distillation component 320. For example, the computing system can define a large language model as the teacher model 315. The computing system can define a custom language model as the student model 310. In some implementations the teacher model 315 can include a large language model with millions and/or billions of parameters. In some implementations, the student model 310 can include a custom language model with a few thousand parameters.

The teacher model 315 can be fully trained. For example, the teacher model can be trained as a part of method 300 and/or before convergence with the one or more student models 310. Any training method can be used to train the teacher model 315. For example, the teacher model 315 can be trained until full convergence. For example, the loss function can be any loss function based on the problem statement.

The computing system can train the student model 310 intelligently using the teacher model 315. In some implementations, for example, student model 310 and teacher model 315 can comprise neural networks. For example, student model 310 can be trained in coordination with the fully trained teacher model 315. In some implementations, training data 305 is input into teacher model 315. Output data 330 of teacher model 315 can be obtained. The computing system can annotate training data 305 by running training data 305 through teacher model 315. The computing system can obtain annotated training data 325 as output data 330 from teacher model 315. Student model 310 can obtain annotated training data 325 as input. The student model 310 can be trained using the annotated training data.

For example, teacher model 315 can include a large language model that can be trained on training data 305. Training data 305 can include, for example, a dataset comprising over 1.56 trillion words of multilingual cleaned public web documents, code, and conversations from the internet. In some implementations, training data 305 can include a seed dataset collected from humans. In some implementations, the computing system can obtain data to augment the training dataset. In some implementations, the training data 305 can include proxy data from content providers (e.g., advertisers) websites. For example, a content provider can have a website that includes an "about us", "our story", "blog", "services", etc. pages. These pages can include business description content. The one or more teacher and/or student models can obtain the proxy data as input and produce an output comprising one or more content items (e.g., headlines, descriptions). In some implementations, training data 305 can include human curated data. Human curated data can be data that is obtained via user input. For example, a user can provide a written business description. The human curated data can be used as seed training data. In some implementations, the computing system can use existing large language models to generate data to be used as training data 305. For example, the large language models can generate descriptions and creative assets. In some implementations, the descriptions and creative assets can include free-form inputs and/or headlines.

Additionally, or alternatively, the teacher model 315 can include an encoder-decoder network. In some implementations the encoder-decoder network can be a general-purpose, multimodal language model with multitask learning capabilities. In some implementations, the encoder-decoder network can be pre-trained on text from billions of high-quality web documents and can be highly tailored for particular subject matter areas (e.g., search results, advertisements, particular businesses).

In some instances, the computing system can tune student model 310. For example, the computing system can input subject matter specific datasets into the student model 310. By providing subject matter specific datasets to the student model 310 during training, the computing system can demonstrate significant improvements in subject matter specific applications (e.g., uses of the student model). Having the student model 310 tuned and/or trained to a specific subject matter can allow for more nuanced understanding of input obtained from users. The more nuanced understanding of input obtained from users can result in better output. The better output can result in less processing done by the computing system due to processing of repetitive inputs and/or increased touch input obtained from a user needing to manually enter data into a plurality of fields with rigid requirements. Additionally, providing for better output can increase user experience and satisfaction.

While teacher model 315 is described as a singular model for purposes of illustration, teacher model 315 can include one or more models. While student model 310 is described as a singular model for purposes of illustration, student model 310 can include one or more models.

In some implementations, the teacher and student set up can include additional and/or alternative means for knowledge distillation. For example, knowledge distillation can include use of distillation component 320 comprising a distillation loss function 335 and a student loss function 345. Distillation loss function 335 can be used for forward propagation of teacher model 315 and student model 310. Distillation can include back propagation of student model 310. For example, by converging the losses of the output of student model 310 and the output of teacher model 315.

Algorithms used for knowledge distillation of teacher model 315 and student model 310 can include, for example, adversarial distillation, multi-teacher distillation, cross-modal distillation, graph-based distillation, attention-based distillation, data-free distillation, quantized distillation, lifelong distillation, and/or neural architecture search-based distillation. Training student model 310 can include, for example, offline distillation, online distillation, and/or self-distillation. Knowledge based distillation can include response-based knowledge, feature-based knowledge, and/or relation-based knowledge. Knowledge distillation can be implemented in a variety of applications. Applications can include, for example, vision, natural language processing, and/or speech.

Vision applications can include, for example, image classification, face recognition, image segmentations, action recognition, video captioning, image retrieval, text-to-image synthesis, and/or video classification. NLP applications can include, for example, text generation, text recognition, neural machine translations, question answering, and/or document retrieval. Speech applications can include, for example, speech recognition, language identification, audio classification, speaker recognition, speech synthesis, speech enhancement, and/or acoustic event detection.

Knowledge distillation can provide for various technical benefits and technical effects. For example, by utilizing a pre-trained model to tune a content specific model, the computing system can conserve computing resources and processing power that would be needed to train a model to perform as well as the pre-trained model without the pre-trained model. Additionally, in some implementations the training datasets can include one or more prompts used to tune the teacher models 315 and/or student models 310. By giving input alongside a prompt, the computing system can tune the models to produce better output than traditional model training methods.

Figure 4:
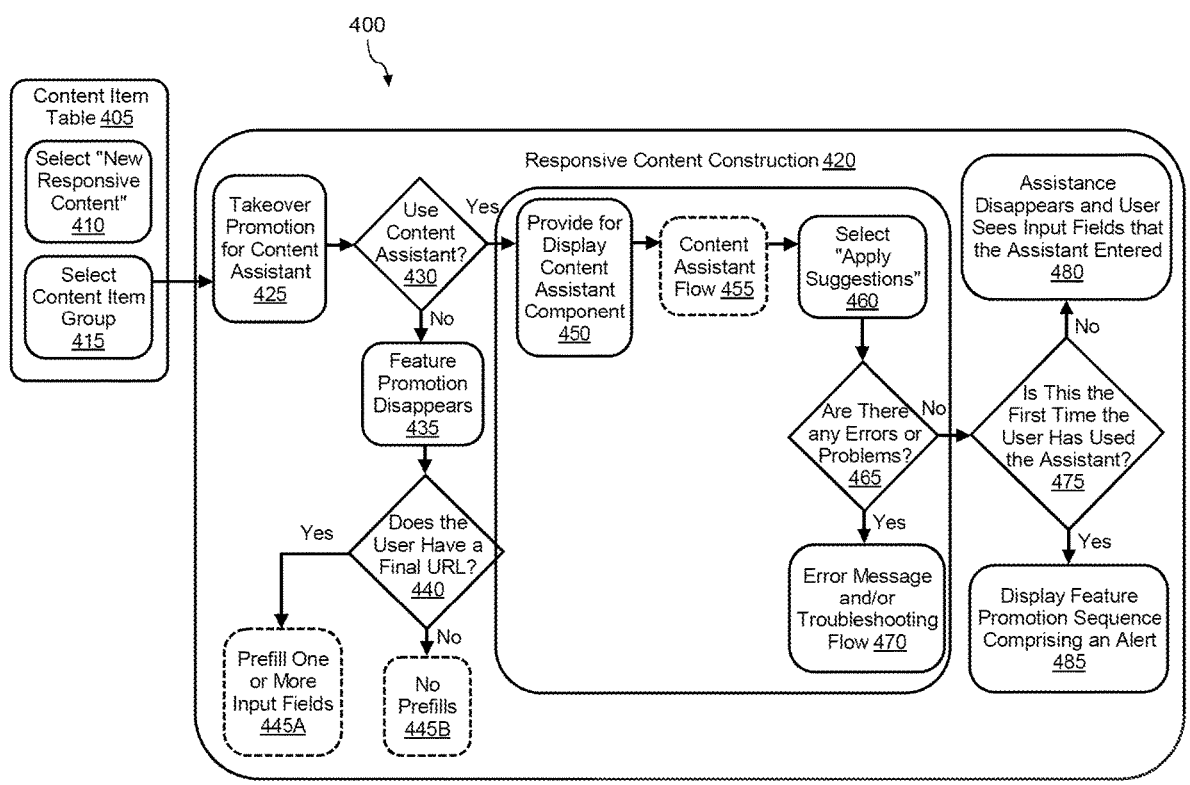
FIG. 4 depicts a flowchart of an example process flow according to example embodiments of the present disclosure.

FIG. 4 depicts a flow chart diagram of a process flow 400 for facilitating content generation via a responsive content construction process at 420. By way of example, the computing system can include a content item table 405. At 410, the computing system can obtain user input indicative of a user selecting (e.g., clicking) an option to generate a new content item (e.g., advertisement, advertisement campaign). At 415, the computing system can obtain user input indicative of a user selecting a content item group. In response to obtaining user input indicative of selecting a content item group, the computing system can initiate responsive content construction at 420.

At 420, the computing system initiating responsive content construction can include providing for display, via a user interface, a takeover promotion for content assistant. For example, at 425, the takeover promotion for content assistant can be provided for display.

At 430, the computing system can provide for display a selectable interface element comprising a message. For example, a message can include a "use content assistant?" message. In some implementations, messages can be displayed with selectable user interface elements labeled "yes" and "no."

By way of example, the computing system can obtain data indicative of a user selecting "no." In response, at 435, the computing system can cause the takeover promotion for content assistant to disappear. At 440, the computing system can provide for display a selectable interface comprising a message. The message can include the following: "does the user have a final URL?". In some implementations, the message can be displayed with selectable user interface elements labeled "yes" and "no." The computing system can obtain data indicative of a user selecting "yes." In response, the computing system can prefill one or more input fields at 445A associated with the user interface for content generation. The computing system can obtain data indicative of a user selecting "no." In response, the computing system can provide for no prefills at 445B for one or more input fields associated with the user interface for content generation.

Figure 8:
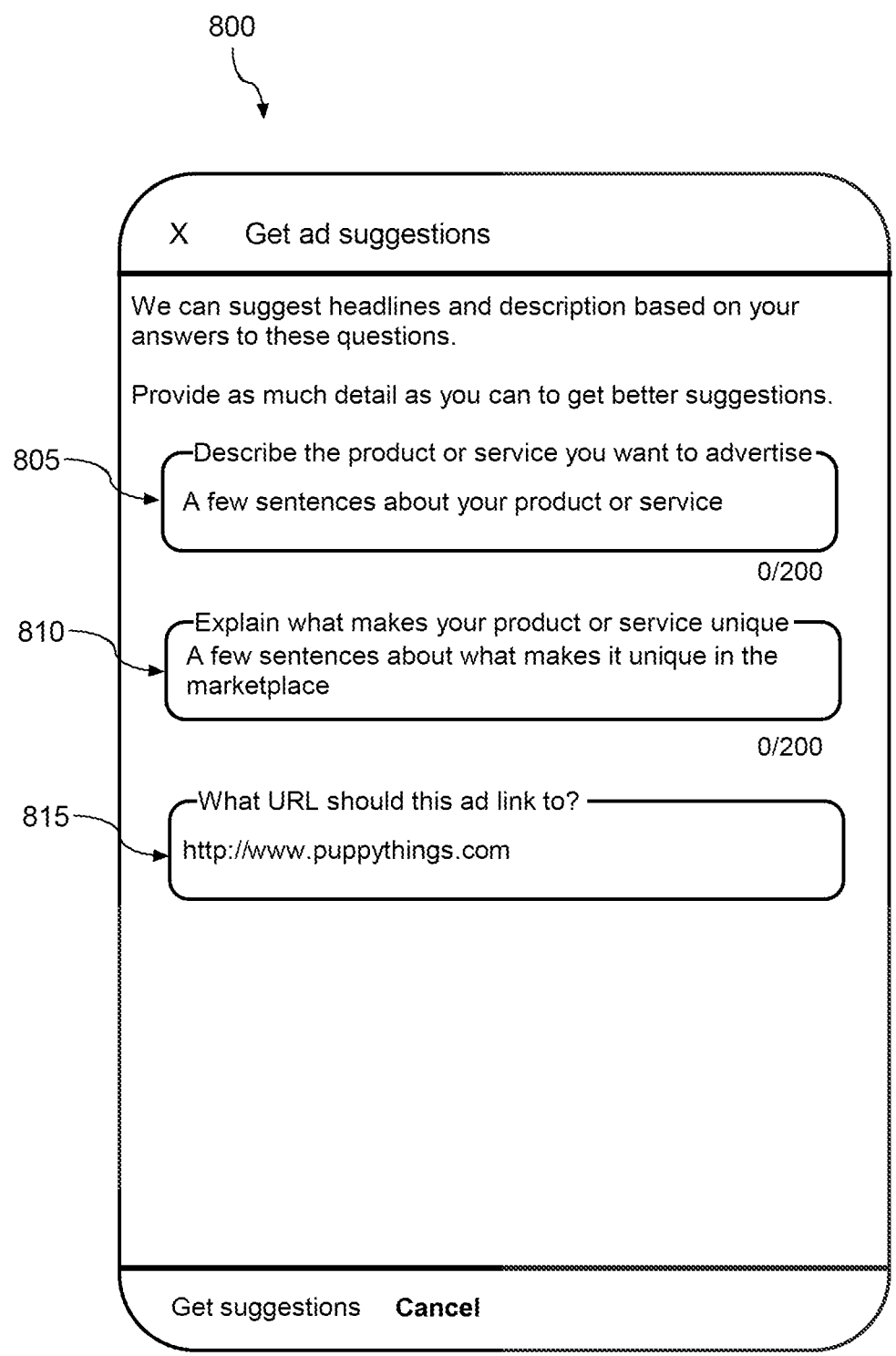
FIGS. 8-10 depicts an example user interface according to example embodiments of the present disclosure.
Figure 9:
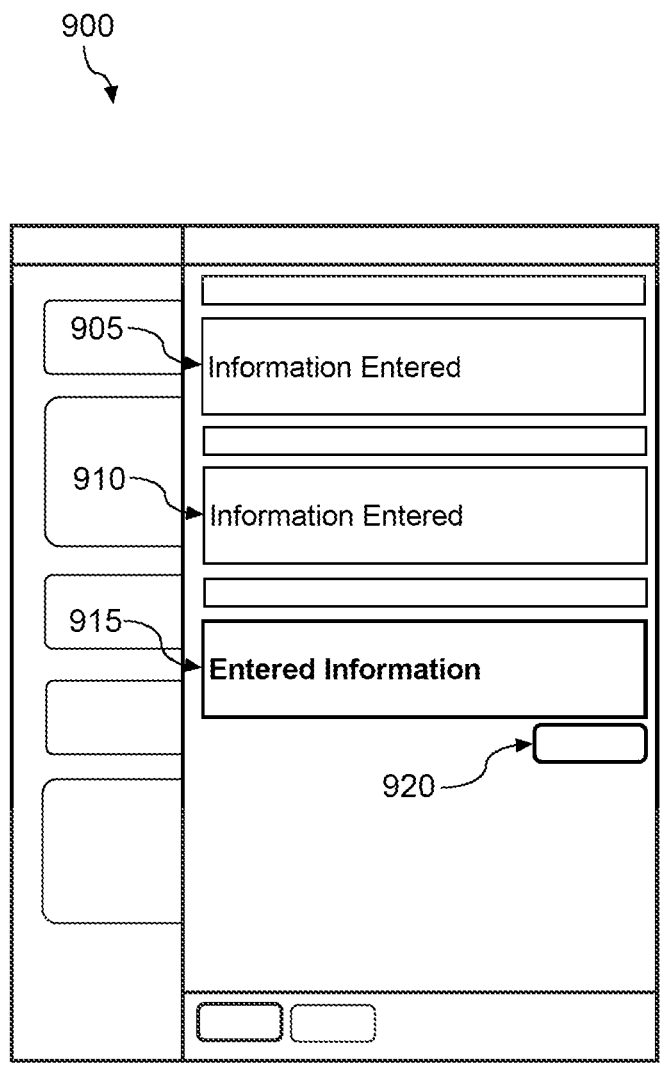
Figure 10:
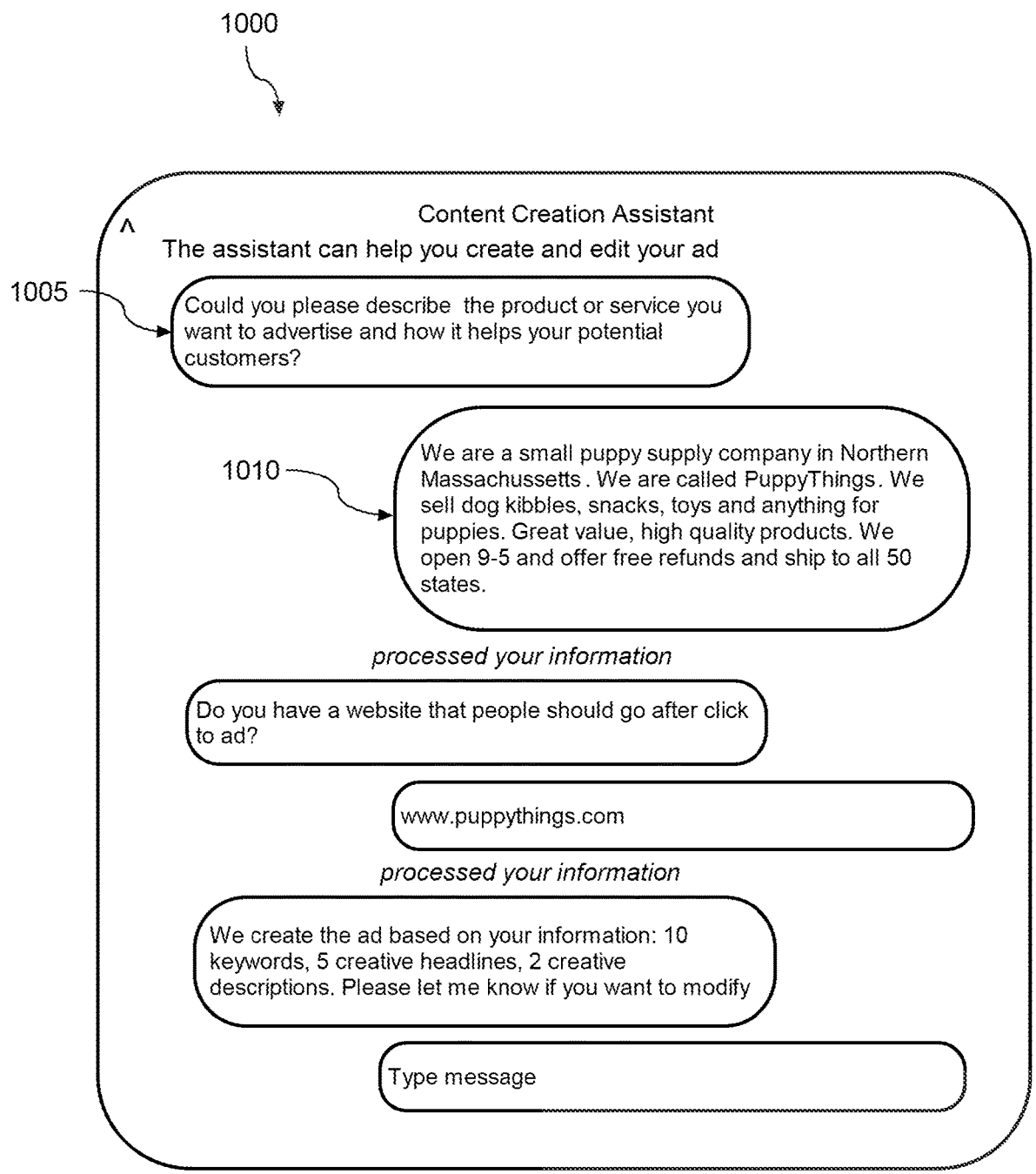

By way of example, in response to display of a message at 430, the computing system can obtain data indicative of user selection of "yes." In response, the computing system can update the user interface to provide for display content assistant 447. At 450, the computing system can provide for display a content assistant component via the user interface. The content assistant component can be displayed in a variety of formats. For example, formats can include a set number of free-form text input fields (e.g., as depicted in FIG. 8), one or more progressive disclosure fields (e.g., as depicted in FIG. 9), and/or a conversational interface (e.g., as depicted in FIG. 10). The computing system can perform a content assistant flow 455. The content assistant flow 455 is discussed in more detail with regard to FIG. 5.

Figure 5:
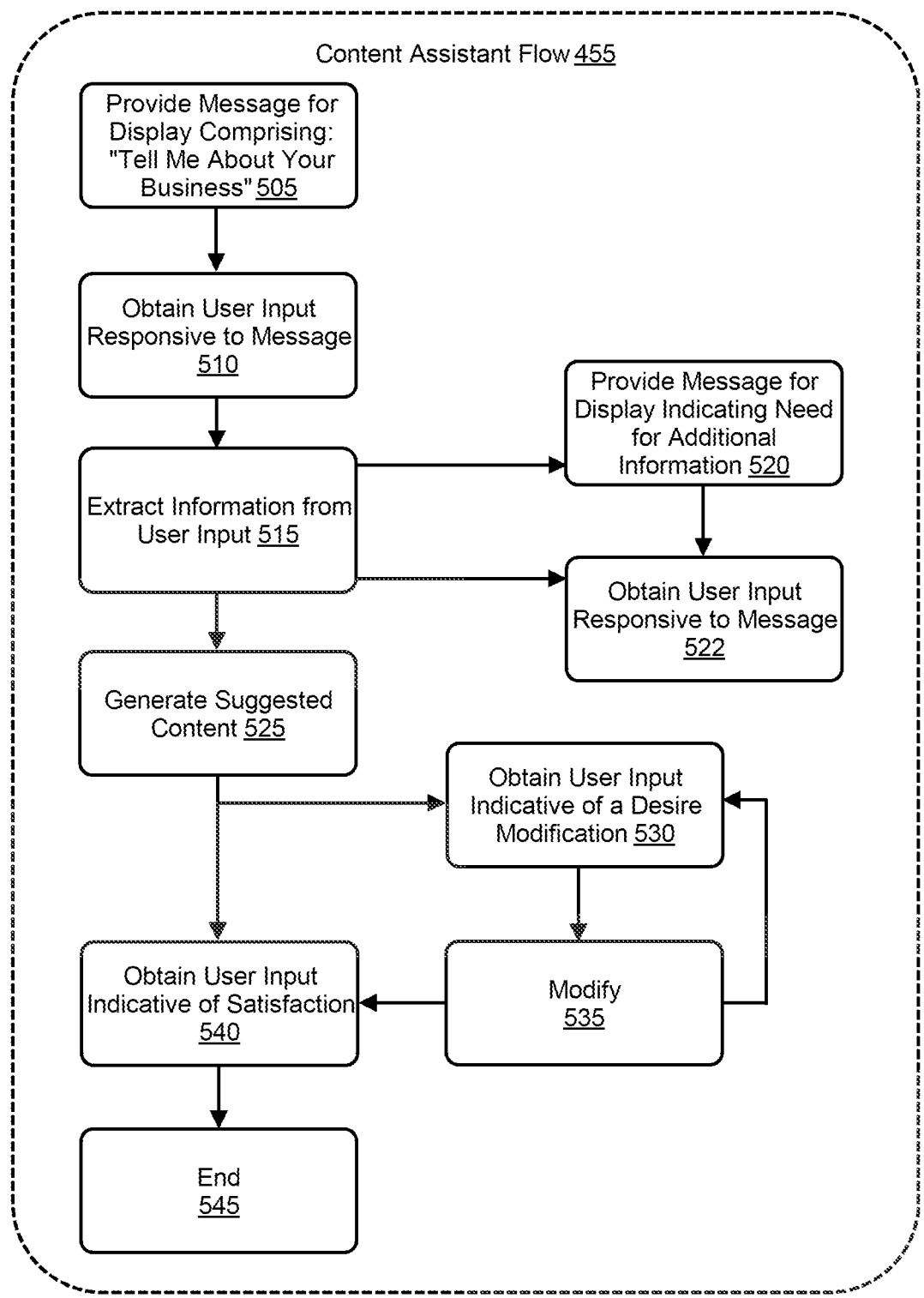
FIG. 5 depicts a flowchart of an example process flow according to example embodiments of the present disclosure.

Turning to FIG. 5, the content assistant flow 455 includes providing an interface for a user to interact with (e.g., a content assistant component of a user interface). As described above the interface can be an audio interface, visual interface, etc. For purposes of explanation, content assistant flow 455 will be described as a visual interface (e.g., a graphical user interface). At 505, the computing system can provide a message for display: "tell me about your business?". The message can include any message that prompts a user to provide input data in a natural language and/or free-form format. At 510, the computing system can obtain user input responsive to display of the message. For example, the message displayed can state "Could you please describe the product or service you want to advertise and how it helps your potential customers?". For example, a user can provide information about their business. A user could provide the following as input: "We are a small puppy supply company in Northern Massachusetts. We are called PuppyThings. We sell dog kibbles, snacks, toys, and anything for puppies. Great value, high quality products. We open 9-5 and offer free refunds and ship to all 50 states."

At 515, the computing system can extract information from the user input. For example, extracted information can include a business name and/or descriptive terms and phrases. For the example depicted in FIG. 10, the system can determine that the business name is PuppyThings. The system can extract other relevant terms such as puppy, kibbles, snacks, toys, high quality, open 9-5, free refunds, ship to all 50 states.

In some implementations, the computing system can determine that additional information is needed. In response, at 520, the computing system can provide a message for display indicating the need for additional information from the user. For example, the message can include a follow-up question, a clarifying question, a question for information not included in the initial user input, etc. For example, as depicted in FIG. 10, the system can provide a follow-up question stating, "Do you have a website that people should go to after they click the ad?".

At 522, the computing system can obtain user input responsive to the message for additional information. For example, as depicted in FIG. 10, the user can provide the following as input: "www.puppythings.com." The computing system can extract information from the user input at 515 as previously described. This process can be repeated as many times as necessary to gather relevant information.

At 525, the computing system can generate suggested content. For example, suggested content can include the population of one or more input fields. In some implementations, content can include an entire generated advertisement and/or campaign. For example, the generated advertisement can include a visual display of a proposed advertisement. By way of example, the computing system could provide for display a summary of a strategy for an advertisement campaign comprising one or more generated advertisements, requirements for display, times for display, expected performance, etc.

Turning to FIG. 10 for example, the computing system can generate the following message: "We created the ad based on your information: 10 keywords, 5 headlines, 2 descriptions. Please let me know if you want to modify it." For example, the computing system can generate following as suggested headlines: anything your puppy needs, kibbles, snacks and toys for your puppy, high quality products for puppy, open 9-5 and free refunds, and ship to all states. The computing system can generate the following as suggested descriptions: puppy supply, great value, high quality, free shipping. Shop today at puppythings.com and/or welcome your new puppy with everything they need. Kibbles, snacks, toys, & more. All at puppythings.com. The computing system can determine the following targeting keywords: puppy supply, dog kibble, dog treats, etc.

At 530, the computing system can obtain user input indicative of a desire for modification of the suggested content. For example, a user can specify that they meant that they offer free refunds and that separately they ship to all 50 states. They can indicate that they do not provide free shipping. The suggested headlines and/or descriptions can be modified based on the user input. For example, the computing system can obtain user input in a natural language format. For example, a user could reply "Please modify the first headline to remove free shipping. Thank you."

At 535, the computing system can modify the content responsive to the user input. In some implementations the computing system can repeat steps 530 and 535 until the computing system obtains input of user satisfaction with the suggested content.

At 540, the computing system can obtain user input indicative of satisfaction. For example, the computing system can obtain data indicative of a user selecting "continue," "accept," etc.

At 545, in response to obtaining user input indicative of satisfaction, the computing system can end the content assistant flow 455. In some implementations, the computing system will continue with the process described in FIG. 4.

Turning back to FIG. 4, following the content assistant flow 455, the computing system can obtain user input indicative of selecting an option to "apply suggestions" at 460. In response, the computing system can populate one or more input fields (e.g., associated with generating a content item, advertisement, etc.). The user can review the populated input fields to determine if there are any errors or problems. At 465, the computing system can provide for display via the user interface a message. The message can include the following: "are there any errors or problems?" In some implementations, the message can be displayed with selectable user interface elements labeled "yes" and "no." The computing system can obtain data indicative of a user selecting "yes." In response, at 470, the computing system can initiate the display of an error message and/or a troubleshooting flow. The computing system can obtain data indicative of a user selecting "no." In response, at 475, the computing system can determine if this is the first time the user has used the assistant.

In some implementations, the computing system can determine that this is not the user's first time using the assistant. In response, at 480, the computing system can cause the assistant to disappear and provide for display input fields that the assistant entered. In some implementations, the computing system can determine that this is the user's first time using the assistant. In response, at 485, the computing system can provide for display a feature promotion sequence comprising an alert. The alert can include highlighting one or more input fields that the assistant populated and/or a notification describing where to locate a content item component and/or content item that was generated by the computing system via responsive content construction at 420.

Figure 6A:
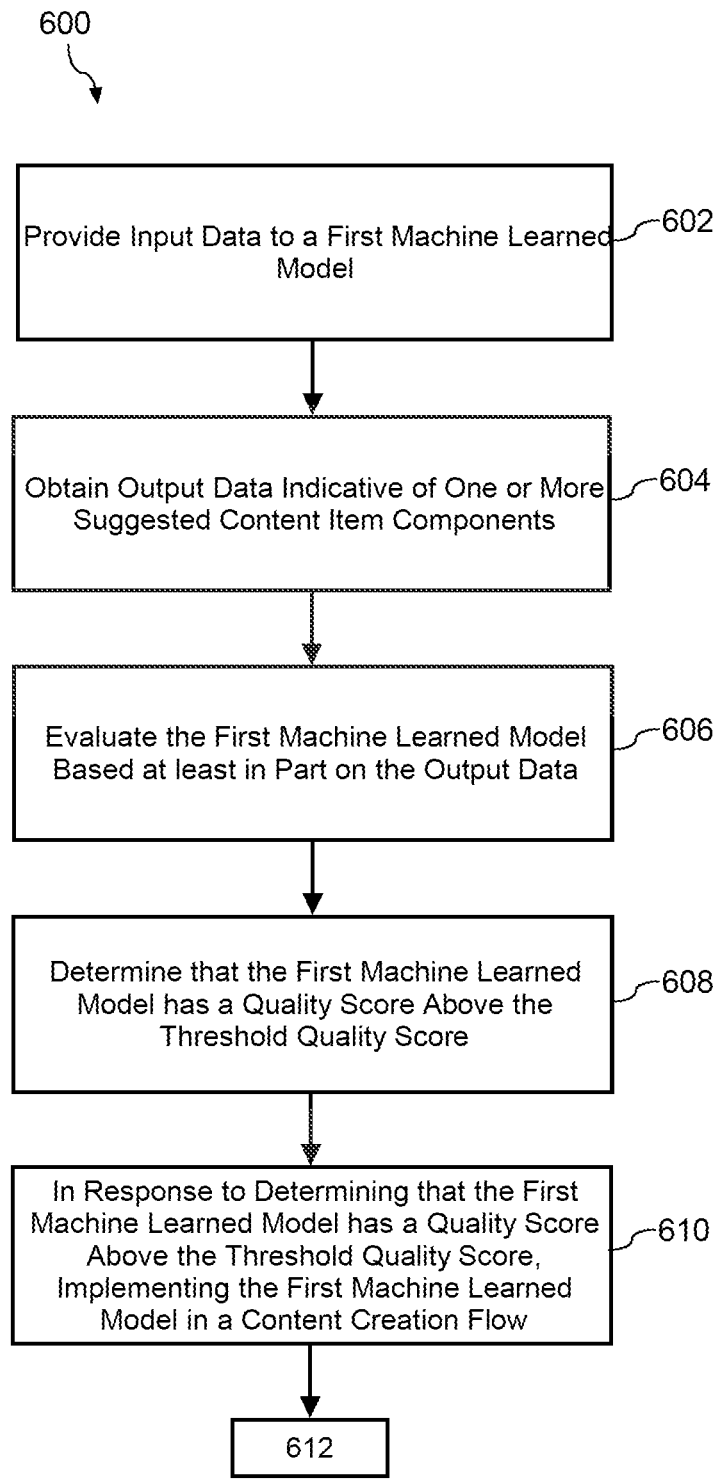
FIGS. 6A-6C depict a flowchart of an example method according to example embodiments of the present disclosure.
Figure 6B:
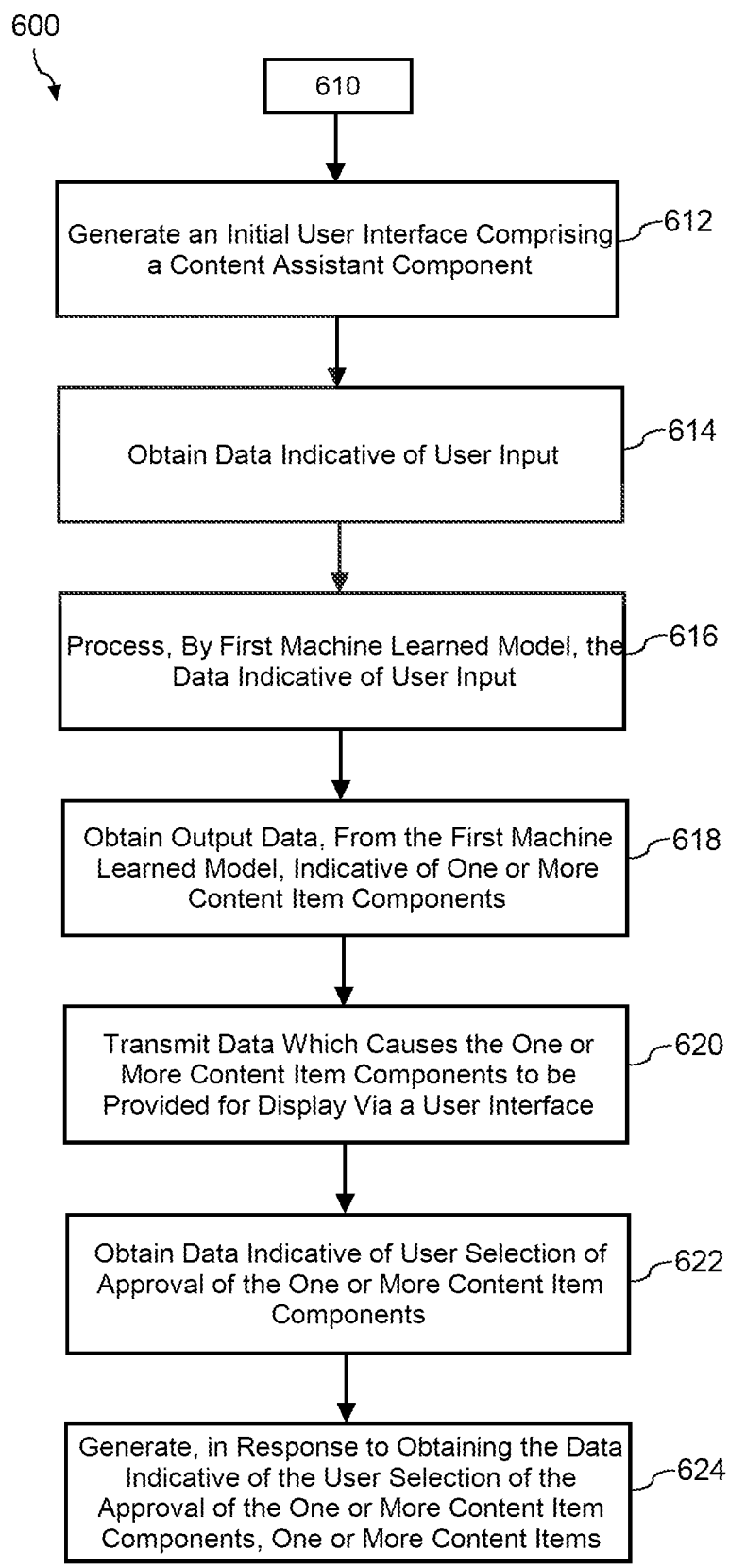
Figure 6C:
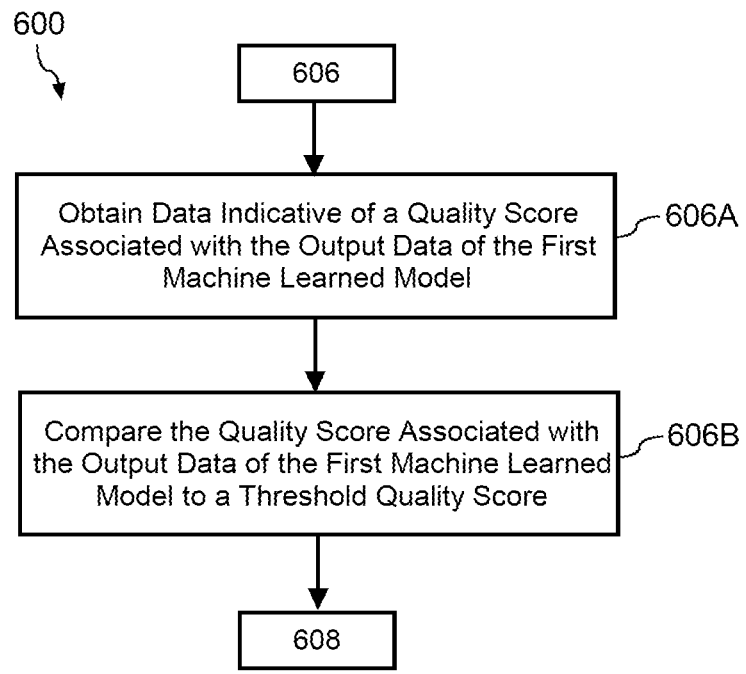

FIGS. 6A-C depict a flow chart diagram of an example method 600 to perform according to example embodiments of the present disclosure. Although FIGS. 6A-C depict steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At (602), method 600 can include providing input data to a first machine learned model. For instance, a computing system can provide input data to a first machine learned model. As described herein input data can include at least one of free-form input and/or landing page content. The input data can include natural language input.

In some implementations, the first machine learned model can be trained using a knowledge distillation training method. For example, the knowledge distillation training method can include training the first machine learned model (e.g., student model) using a pre-trained larger teacher model (e.g., complex large language model). In some embodiments the first machine learned model can be trained based at least in part on output from a pre-trained second machine learned model.

In some implementations, the pre-trained second machine learning model can be a large language model. The pre-trained second machine learned model can be tuned using one or more prompts. For example, the system can tune the model to generate suggested assets from free-form inputs with few-shot learning. For example, inputs can include prompts. Prompts can include headlines and/or descriptions. For example, headlines can include a new tycoon game, try our dog friendly cafe, build your dog paradise, or the coolest app for dogs in the US. Descriptions can include serving amazing drinks in the friendliest dog cafe and dog café tycoon: feed the hungry customer and grow your dog cafe empire.

At (604), method 600 can include obtaining output data indicative of one or more suggested content item components. For instance, a computing system can obtain output data indicative of one or more suggested content item components. By way of example, content item components can include at least one of a headline or description. By way of example, the output of the model can include a generated text output. For example, the text could include "Dog Cafe Tycoon is a Simulation app. Here is a brief introduction of the app: A new tycoon game to build your dog paradise. It serves drinks in the dog café and helps to grow your dog café empire. Key topic keywords for this application are dog café. The target country is the US." Tuning the large language model can increase the ability for the model to produce more nuanced content item suggestions in the future. For example, generating an advertisement can include the need to understand nuances associated with a business, goals of a particular user, etc. This language processing can be different from other language processing applications.

At (606), method 600 can include evaluating the first machine learned model based at least in part on the output data. For instance, a computing system can evaluate the first machine learned model based at least in part on the output data. As described herein, the evaluation of the first machine learned model can be performed based at least in part on determining quality scores associated with the output data of the first machine learned model.

At (606A), method 600 can include obtaining data indicative of a quality score associated with the output data of the first machine learned model. For instance, a computing system can obtain data indicative of a quality score associated with the output data of the first machine learned model. By way of example, the quality score can be automatically generated by the system and/or manually entered by a user.

At (606B), method 600 can include comparing the quality score associated with the output data of the first machine learned model to a threshold quality score. For instance, a computing system can compare the quality score associated with the output data of the first machine learned model to a threshold quality score. By way of example, the computing system can continuously evaluate the models. The computing system can determine that the quality of the output data is acceptable. For example, in a training implementation, the output data can be obtained for input data that has been previously tagged and/or processed by a pre-trained model. The system can compare the actual output data to expected output data.

At (608), method 600 can include determining that the first machine learned model has a quality score above the threshold quality score. For instance, a computing system can determine that the first machine learned model has a quality score above the threshold quality score. As described herein a quality score can be associated with a quality of output data.

At (610), method 600 can include in response to determining that the first machine learned model has a quality score above the threshold quality score, implement the first machine learned model in a content creation flow. For instance, a computing system can in response to determining that the first machine learned model has a quality score above the threshold quality score, implementing the first machine learned model in a content creation flow. A content creation flow can be associated with a third party that provides a platform for content creators to generate customized content items (e.g., search results for display that link to a website, an advertisement, generated content items). A content creation flow can include a user interface for generating a content item. The content creation flow can include providing for display a content assistant component of a user interface.

At (612), method 600 can include generating an initial user interface comprising a content assistant component. For instance, a computing system can generate an initial user interface comprising a content assistant component. As described herein, the initial user interface can include a content assistant component. The content assistant component can be configured to obtain user input, and in response, generate suggested content (e.g., headlines, descriptions, advertisements, videos, images, sound bites, etc.). In some implementations, the content assistant component can include one or more input fields. For example, the content assistant component can include a set number of predetermined input fields. In some implementations the content assistant component can include a plurality of progressively displayed input fields. In some implementations, the content assistant component can be configured to provide a conversational interface.

In some implementations, user input can include text snippets, documents, images, handwriting, audio, etc. In some implementations a user may not have a strong landing page associated with their website. In response, the computing system can initiate an input funnel to obtain user input. Additionally, or alternatively, user input can include fine-granted controls on a content item strategy. For example, the content item can be an advertisement, and the strategy can correlate to a campaign. The system can obtain user input indicative of the user selecting one or more fine-granted controls including requirements through interactions with the system and adaptations for the campaigns.

At (614), method 600 can include obtaining data indicative of user input. For instance, a computing system can obtain data indicative of user input. User input can include input obtained from a user through any means. The means can include touch input (e.g., via a touch sensor keyboard), voice input, etc.

At (616), method 600 can include processing, by the first machine learned model, the data indicative of user input. For instance, a computing system can process, by the first machine learned model, the data indicative of user input. Processing the data indicative of user input can include transforming the data from a natural language input into a feature vector or some other data structure to be ingested by the first machine learned model.

At (618), method 600 can include obtaining output data, from the first machine learned model, indicative of one or more content item components. For instance, a computing system can obtain output data, from the first machine learned model, indicative of one or more content item components. By way of example, the one or more content item components can include a headline, description, video, image, tagline, sound bite, etc. The content items can be generated and/or retrieved by the content assistant component.

At (620), method 600 can include transmitting data which causes the one or more content item components to be provided for display via a user interface. For instance, a computing system can transmit data which causes the one or more content item components to be provided for display via a user interface. For example, the content item components can be headlines, descriptions, etc. that are populated in one or more input fields associated with a content creation flow form.

At (622), method 600 can include obtaining data indicative of user selection of approval of the one or more content item components. For instance, a computing system can obtain data indicative of user selection of approval of the one or more content item components. For example, the computing system can obtain data indicative of user selection of an "accept," "confirm," "create advertisement," or some other notification indicating approval of the content item components.

At (624), method 600 can include generating, in response to obtaining the data indicative of the user selection of the approval of the one or more content item components, one or more content items. For instance, a computing system can generate, in response to obtaining the data indicative of the user selection of the approval of the one or more content item components, one or more content items. For example, a content item can be an advertisement comprising a plurality of content item components. In some implementations a content item can include a plurality of headlines, descriptions, videos, images, taglines, etc. Based on the processed user input and/or other user data, the system can generate one or more content items using the one or more content item components.

Figure 7:
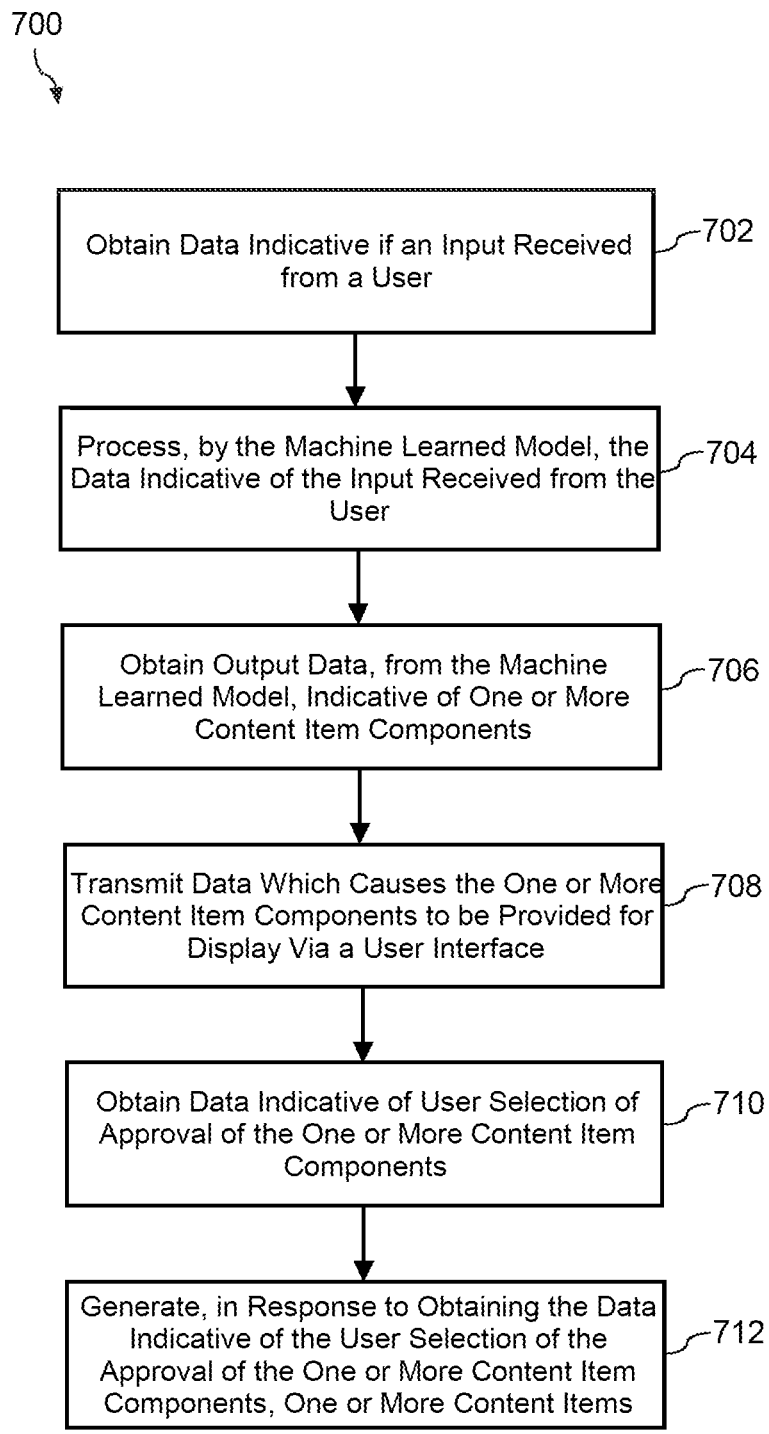
FIG. 7 depicts a flowchart of an example method according to example embodiments of the present disclosure.

FIG. 7 depicts a flow chart diagram of an example method 700 to perform according to example embodiments of the present disclosure. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

At (702), method 700 can include obtaining data indicative of an input received from a user. For instance, a computing system can obtain data indicative of an input received from a user. Input from a user can include free-form input and/or landing page input. For example, free-form input can include a user describing themselves and/or an associated business using natural language. The user input can include a uniform resource locator (URL). In some instances, the URL can be associated with a website and/or landing page of a website associated with the user. In some implementations, the system can obtain data from the landing page to generate one or more content item components and/or content items to suggest to the user.

At (704), method 700 can include processing, by the machine learned model, the data indicative of the input received from the user. For instance, a computing system can process, by the machine learned model, the data indicative of the input received from the user.

In some implementations, method 700 can include training one or more machine learned models for implementation in a content creation flow. For instance, a computing system can train one or more machine learned models for implementation in a content creation flow. By way of example, the one or more machine learned models can be trained in any manner. For example, the one or more machine learned models can be trained using a knowledge distillation training method. In some implementations training the one or more machine learned models can include inputting labeled data into a first machine learned model. In some implementations, the system can obtain output data from the first machine learned model to output data from an expected machine learned model. The system can adjust the first machine learned model based on comparing the output data of the first and expected machine learned models.

In some implementations, the labeled data can include data that is output by a second machine learned model, wherein the second machine learned model is a pre-trained model. The output obtained by the expected machine learned model can include annotated data. For example, the system can annotate input data with the expected outcome based on the output when the same input data was processed by the expected machine learned model. In some implementations, the annotated data can be a silver training set. By way of example, the labeled data can include at least one of business and product descriptions, proxy data from websites associated with a content creator, human curated data, or free-form inputs.

In some implementations, training the one or more machine learned models can include inputting unlabeled data into a first machine learned model and a pre-trained second machine learned model. The training can include obtaining output data from the first machine learned model and the second machine learned model. The training can include adjusting the first machine learned model based on comparing the output data of the first machine learned model and the output of the second machine learned model. For example, the system can perform a loss regression on the output of the first and second machine learned models. In some instances, the system can continuously update and re-process input until the difference between the output of the first and second machine learned model are within an acceptable threshold.

In some implementations, the method can include implementing the machine learned model in a content creation flow. For instance, a computing system can implement the machine learned model in a content creation flow. A content creation flow can be associated with a third party that provides a platform for content creators to generate customized content items (e.g., search results for display that link to a website, an advertisement, generated constructed content items).

In some implementations, the method can include generating an initial user interface comprising a content assistant component. For instance, a computing system can generate an initial user interface comprising a content assistant component. In some implementations, the initial user interface can be a graphical user interface.

At (706), method 700 can include obtaining output data, from the machine learned model, indicative of one or more content item components. For instance, a computing system can obtain output data, from the machine learned model, indicative of one or more content item components. For example, content item components can include one or more suggestions for content. For example, the content can include suggested headlines, descriptions, images, videos, taglines, etc. In some implementations, the content can include a generated advertisement.

At (708), method 700 can include transmitting data which causes the one or more content item components to be provided for display via a user interface. For instance, a computing system can transmit data which causes the one or more content item components to be provided for display via a user interface. For example, the system can populate existing user input fields with content generated by the model. In some implementations, the system can generate entire suggested content items (e.g., advertisements).

At (710), method 700 can include obtaining data indicative of user selection of approval of the one or more content item components. For instance, a computing system can obtain data indicative of user selection of approval of the one or more content item components. By way of example, the system can obtain data indicative of a selection of a user interface element indicative of user selection of an "accept", "confirm", "create advertisement", or some other notification indicating approval of the content item components.

At (712), method 700 can include generating, in response to obtaining the data indicative of the user selection of the approval of the one or more content item components, one or more content items. For instance, a computing system can generate, in response to obtaining the data indicative of the user selection of the approval of the one or more content item components, one or more content items.

Example User Interfaces

FIGS. 8-10 depict example content assistant components of user interfaces according to example embodiments of the present disclosure. The computing system can provide for display a content assistant component via the user interface. The content assistant component can be displayed in a variety of formats. For example, formats can include a set number of free-form text input fields (e.g., as depicted in FIG. 8), one or more progressive disclosure fields (e.g., as depicted in FIG. 9), and/or a conversational interface (e.g., as depicted in FIG. 10).

FIG. 8 depicts an example content assistant component 800 comprising a set number of free-form text input fields 805, 810, 815. For example, a first free-form text input field 805 can include a prompt for a user to "describe the product or service you want to advertise." The computing system can obtain data indicative of user input into the free-form text input field 805. The free-form text input can be natural language input by the user. A second free-form text input field 810 can include a prompt for a user to "explain what makes your product or service unique." The computing system can obtain data indicative of user input into the free-form text input field 810. A third free-form text input field 815 can include a prompt for a user to "what RL should this ad link to?" In some implementations, the content generated can be an advertisement. For example, a user can provide a uniform resource locator (URL) that directs a user to a website associated with the user. For example, the user can be associated with a business called Puppy Things. The URL associated with the business can be "http://www.puppythings.com".

FIG. 9 depicts an example content assistant component 900 comprising one or more progressive disclosure fields. For instance, content assistant component 900 can include a first progressive disclosure field 905. The first progressive disclosure field 905 can be presented when the content assistant component 900 is first initiated. As a user provides input into the first progressive disclosure field 905, the system can provide for display second progressive disclosure field 910. After the system determines a user has input data into second progressive disclosure field 910, the system can provide for display third progressive disclosure field 915.

In some implementations, the progressive disclosure fields 905, 910, and/or 915 can be predetermined fields. Additionally, or alternatively, the progressive disclosure fields may be determined based on processing of information obtained as user input to a previously disclosed progressive disclosure field. For example, a first progressive disclosure field 905 could indicate "tell me about your business." If a user provides a short 1-2 generic sentence answer, the second progressive disclosure field 910 could indicate a more pointed prompt than if the user provides a multiple paragraph answer in first progressive disclosure field 905. When a user has completed providing input into the one or more progressive disclosure fields, the system can obtain data indicative of a user selecting a submit element 920. In response, the system can process the user input provided via the progressive disclosure fields and provide content suggestions via the content creation flow.

FIG. 10 depicts an example content assistant component 1000 comprising a conversational user interface. In some implementations, the content assistant component 1000 can include a back-and-forth communication session between a user and the content assistant. For example, the content assistant can provide an initial prompt 1005 to a user. The user can provide a reply 1010. The computing system can facilitate the transmission of multiple communications between a user and the content assistant. As described with regard to FIG. 5, the computing system can provide follow-up questions, process the data indicative of the user input associated with the user's responses and generate suggested content based on the processing of the user input (e.g., via a machine learned natural language processing model).

ADDITIONAL DISCLOSURE

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computing system, comprising:
    one or more processors; and
    one or more non-transitory computer-readable media storing instructions that are executable to cause the one or more processors to perform operations, the operations comprising:
        obtaining, via a conversational campaign assistant interface, by a custom trained machine-learned model, natural language input, wherein the natural language input comprises at least a website uniform resource locator (URL);
        accessing, via the custom machine-learned model, data associated with a website associated with the website URL;
        generating output comprising one or more suggested content item components based on the accessed data and natural language input;
        responsive to generating the output comprising the one or more suggested content item components, automatically populating one or more input fields with the one or more suggested content item components; and
        transmitting instructions that, when executed, cause a client device to provide the one or more suggested content item components for display via a user interface.

2. The computing system of claim 1, the operations comprising:
    generating an initial user interface comprising a content assistant component;
    obtaining data indicative of user input;
    processing, by the custom trained machine-learned model, the data indicative of user input;
    obtaining output data, from the custom trained machine-learned model, indicative of one or more content item components;
    transmitting data which causes the one or more content item components to be provided for display on a user interface;
    obtaining data indicative of user selection of approval of the one or more content item components; and
    generating, in response to obtaining the data indicative of the user selection of the approval of the one or more content item components, one or more content items comprising a plurality of the content item components.

3. The computing system of claim 2, wherein the content assistant component comprises one or more input fields.

4. The computing system of claim 1, wherein the custom trained machine-learned model has been trained using a knowledge distillation training method.

5. The computing system of claim 4, wherein the custom trained machine-learned model has been trained based at least in part on output from a pre-trained second machine-learned model.

6. The computing system of claim 5, wherein the pre-trained second machine-learned model is a large language model.

7. The computing system of claim 6, wherein the pre-trained second machine-learned model is tuned using one or more prompts.

8. The computing system of claim 1, wherein the input data comprises at least one of free-form input comprising natural language input.

9. The computing system of claim 1, wherein the input data comprises landing page content.

10. The computing system of claim 1, wherein the one or more content item components comprises a description.

11. A computer-implemented method, performed by one or more processors, comprising:
    generating an initial user interface comprising a conversational campaign assistant interface;
    obtaining, via the conversational campaign assistant interface, by a custom trained machine-learned model, natural language input, wherein the natural language input comprises at least a website uniform resource locator (URL);
    accessing, via the custom machine-learned model, data associated with a website associated with the website URL;
    generating output comprising one or more suggested content item components based on the accessed data and natural language input,
    responsive to generating the output comprising the one or more suggested content item components, automatically populating one or more input fields with the one or more suggested content item components; and
    transmitting instructions that, when executed, cause a client device to provide the one or more suggested content item components for display via a user interface.

12. The computer-implemented method of claim 11, wherein the custom trained machine-learned model has been trained using a knowledge distillation training method.

13. The computer-implemented method of claim 11, wherein the one or more suggested content items comprise at least one of images, videos, or taglines.

14. The computer-implemented method of claim 11, wherein generating output comprising one or more suggested content item components comprises generating a suggested content item comprising the one or more suggested content item components.

15. The computer-implemented method of claim 11, comprising:
    obtaining input comprising selection of a first content item component of the one or more content item components; and
    generating, responsive to obtaining the input comprising selection of the first content item component, a content item based at least in part on the first content item component.

16. The computer-implemented method of claim 11, comprising:
    generating, based on the natural language input data, one or more follow-up questions; and
    providing for display the one or more follow-up questions.

17. The computer-implemented method of claim 11, wherein the one or more input fields comprise at least one of headlines, descriptions, or keywords.

18. One or more non-transitory computer readable media storing instructions that are executable by one or more processors to perform operations comprising:
- generating an initial user interface comprising a conversational campaign assistant interface;
- obtaining, via the conversational campaign assistant interface, by a custom trained machine-learned model, natural language input, wherein the natural language input comprises at least a website uniform resource locator (URL);
- accessing, via the custom machine-learned model, data associated with a website associated with the website URL;
- generating output comprising one or more suggested content item components based on the accessed data and natural language input;
- responsive to generating the output comprising the one or more suggested content item components, automatically populating one or more input fields with the one or more suggested content item components; and
- transmitting instructions that, when executed, cause a client device to provide the one or more suggested content item components for display via a user interface.

19. The one or more non-transitory computer readable media of claim 18, the operations comprising:
- generating an initial user interface comprising a content assistant component;
- obtaining data indicative of user input;
- processing, by the custom trained machine-learned model, the data indicative of user input;
- obtaining output data, from the custom trained machine-learned model, indicative of one or more content item components;
- transmitting data which causes the one or more content item components to be provided for display on a user interface;
- obtaining data indicative of user selection of approval of the one or more content item components; and
- generating, in response to obtaining the data indicative of the user selection of the approval of the one or more content item components, one or more content items comprising a plurality of the content item components.

20. The one or more non-transitory computer readable media of claim 18, wherein the custom trained machine-learned model has been trained using a knowledge distillation training method.

* * * * *